May 1, 1962 C. A. MAGNAGUAGNO 3,032,452

SPACING DEVICE FOR SHAPING ROLLS, PARTICULARLY FOR USE IN PRODUCING POLYMERIZED RESIN REINFORCED MATERIALS, SUCH AS GLASS FIBERS

Filed Jan. 14, 1958

3,032,452
Patented May 1, 1962

3,032,452

SPACING DEVICE FOR SHAPING ROLLS, PARTICULARLY FOR USE IN PRODUCING POLYMERIZED RESIN REINFORCED MATERIALS, SUCH AS GLASS FIBERS

Cleante Arduino Magnaguagno, Milan, Italy, assignor to Montecatini Società Generale per l'Industria Mineraria e Chimica, Milan, Italy, a corporation of Italy Filed Jan. 14, 1958, Ser. No. 708,902
Claims priority, application Italy Feb. 15, 1957
16 Claims. (Cl. 156—595)

This invention relates to an apparatus for the continuous production of corrugated, reinforced plastic material. It particularly relates to the production of a polyester resin reinforced by glass fiber.

The apparatus constitutes an improvement upon that described in the U.S. patent application of Ugo Monaco, Serial No. 380,247, filed September 15, 1953.

The use of pure polyester resins, that is, without a reinforcing body or filler, is known to be of little interest. Their fragility does not, generally, permit the fabrication of large dimensioned products. On the other hand, there is a large field of application for rolled reinforced plastics, especially polyester resins. These resins, in combination with different reinforcing fabrics, such as cotton, wool, silk, paper, and particularly fiber glass, give products possessing a very high mechanical strength, varying according to the particular type of the body or filler used, fiber glass giving exceptionally good results. Further, the nature of polyester resin is such as to render possible their complete polymerization with very slight heat and pressure application, which permits the molding by means of simple and limited weight machines of products of considerable dimensions and possessing great strength. In fact, the physico-mechanical properties of fiber glass reinforced sheets of polyester resin are higher than those of steel, on the basis of strength to weight. They are further characterized by very light weight and resistance to dampness and solvents, and can advantageously compete with light metals.

Some products, amongst which are flat laminates of glass fabric combined with polyester resin, are made by continuous machines that are on the market. In this case, however, the impregnation is exclusively effected by the continuous immersion of the fabric in the resin. The fiber glass and resin bands are then pre-polymerized so that the too fluid resin will not run off the fabric, after which they pass into the true and proper polymerizing chamber in which by the action of heat and light pressure the complete hardening is obtained. The continuous production of these flat rolled sheets generally presents no special difficulty.

On the other hand, the operation of forming corrugated reinforced plastics, especially when reinforced by glass fabric (or mat), is difficult to perform and there are several difficulties to overcome. It has been established that the application of glass fabric over curved surfaces, even if only having medium-sized radii of curvature, is not an easy matter; glass fiber fabrics do not sufficiently lengthen or stretch out as do cotton and organic fibers to adapt themselves even to a slightly curved form, especially on account of the dimensional stability of glass.

To this difficulty is added the problem that the resin must set during the stay of the reinforced plastic in the continuous mold of the machine.

For the production of corrugated plastic flat rolled material, machines have been proposed through the axially fluted rolls of which passes the material that thus acquires the corrugations. These machines, however, are complicated and costly.

The principal purpose of the present invention is to provide a comparatively simply constructed machine for the uses described above, that is, to produce such a laminate having corrugations extending transversely to the feed direction. The machine in effect provides a continuous mold designed to contain or sustain a substantial surface area of the material being corrugated during the time required for hardening of the resin. This is accomplished without causing undesirable tensile stresses in the polyester resin, fiber glass reinforced, plastic. The elements constituting the continuous mold possess a significant degree of independence of relative movement, or displacement, with respect to each other, and the position of one of the elements is accurately adjustable with respect to the other. This permits adaptation to possible imperfections in the material undergoing corrugation. The apparatus system also includes means for impregnating the fiber glass, where this is the material being processed.

The basic machine essentially comprises two endless bands carrying parallel transverse rollers, the radii and pitch of which correspond to the desired radius and pitch of the corrugation. The rollers are preferably carried by a pair of endless chains. The chains of the lower band run on a continuous flat support. Each of the rollers of the upper band enters between two of the lower rollers. In order that the form of the corrugated sheet produced be the correct one, and to preclude the possibility of irregularities, that may be caused by defects in the chains, the lower rollers are provided at each end with spacing collars. These collars have the maximum thickness of the laminate, and support the upper rollers.

While the lower rollers are firmly fixed or attached to the chains, a certain amount of play is permitted to the upper rollers in order that they may fit accurately against the lower rollers. The upper rollers have a certain degree of freedom with respect to their chains, to accommodate small irregularities of the lower rollers or of the material to be corrugated.

Although the said machine is suitable for the production of a corrugated laminate responding to the purpose intended, the product obtained is sometimes of non-uniform thickness and the corrugations at times are not completely regular. To produce corrugated laminates having regular corrugations and uniform thickness the shaping rollers supported by the bands must remain perfectly straight and parallel to each other. The present invention provides an auxiliary device which makes possible the obviating of these inconveniences, resulting in marked technical advantages as well as a better appearance of the corrugated laminate produced. The auxiliary device, in its preferred embodiment, is essentially a chain which supports wheels which are placed or introduced between the shaping rollers of the above-described corrugating machine. It is set up on the machine described in the Monaco application, in positional correspondence with its central line. In this way the wheels act on the shaping rollers of the corrugating machine, being successively inserted between two successive rollers. The position of the axle base of the wheels is calibratively regulated or determined. This device makes possible the production of a corrugated sheet of more uniform thickness, and thinner than that obtained with the machine described in the said prior application. Moreover, use of this device, as already mentioned above, results in an improvement in the surface aspect of the laminate obtained.

A preferred embodiment of the invention will now be described with reference to the accompanying diagrammatic drawing in which.

Figure 1:
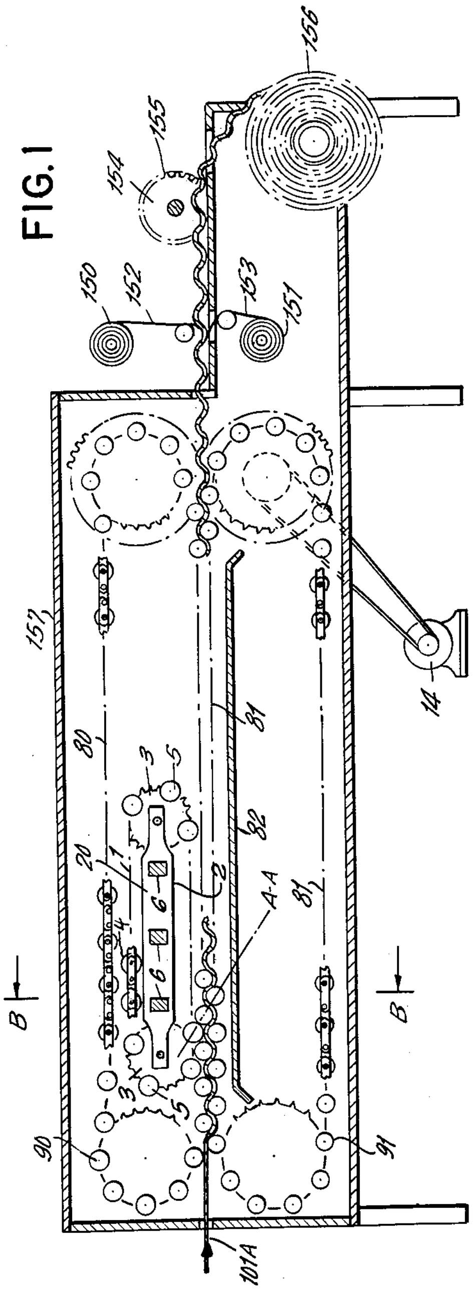
FIG. 1 is a view in vertical section, taken parallel to the feeding direction of the laminate, of the machine described in the prior application, provided with the device in accordance with the present invention.

The auxiliary wheel and chain device comprises an endless, idler chain 1 which moves at the same speed as chains 80 and 81 of the corrugating machine, since it is dragged by indirect or direct contact with shaping rollers 90, 91, carried by chains 80, 81. The idler chain 1 is supported by a frame 2 which is provided with sprocket wheels 3, which carry transmission end portions of said chain.

Figure 2:
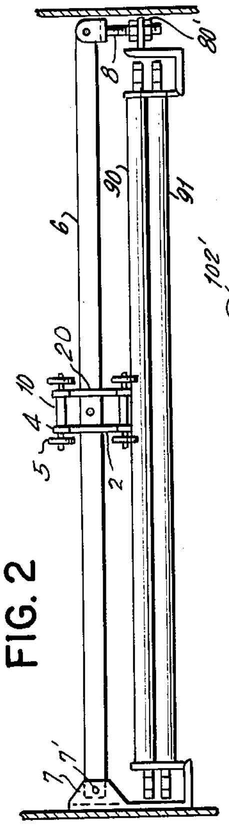
FIG. 2 is a view in a vertical transverse section taken on line B—B of FIG. 1, but with the chains omitted, for clarity.

The links of idler chain 1 are identical with those of the corrugating chains 80 and 81. Adjacent the ends of each of the pins 10 (FIG. 2), which join the various links of idler chain 1, two ball bearings 4 are mounted which allow the smooth movement of the chain 1 on the upper surfaces of guides 20 of frame 2. At the ends of said pins two wheels 5 are mounted, which act on the shaping rollers 90, 91 of the corrugated machine.

Wheels 5 have a spacing action on the shaping rollers, compelling them to rectify any irregular positioning that may occur, thus assuring parallelism of the rollers.

The auxiliary device functions substantially as a mobile calibrated comber which checks the shaping rollers. Even in the central zone of the laminate, a constant, that is a calibrated, distance between the axle bases of the tubes is maintained.

The auxiliary device, or more precisely its frame 2, is supported by two or more transverse beams 6 (FIG. 2) pivoted at one end on frame 7 of the corrugating machine. The other end of each beam 6 is supported by an individual and articulated threaded support 8 which can be adjusted vertically by means of two nuts 80'.

Figure 3:
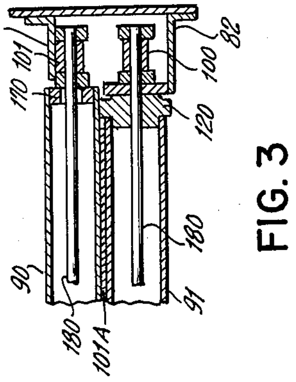
FIG. 3 is a lateral section at A—A of FIG. 1.

The main structure of the corrugating machine, and the processing details, are similar to those described in the said prior application. This apparatus comprises two endless chain belts 80 and 81 each carrying a series of transverse rolls 90, 91 whose radius is the same as that of the corrugations and which are placed to correspond to the pitch of the corrugations. The chains 81 of the lower belt slide over a continuous flat support 82. The rollers 90 of the upper belt fit in between the rollers 91 of the lower belt. The lower rollers 91 carry, at each of their ends, a collar 120 (FIG. 3) corresponding to the maximum thickness of the rolled material. Upon the collars lay the upper rollers 90. The lower rollers 91 are positively fixed to chains 100 of the lower belt so as to permit substantially no play. The upper rollers 90 have a degree of freedom of movement, or play, with respect to the chains 101 of the upper belt. For this reason, the annular collars 170 (FIG. 3) of the upper rollers have a greater inner diameter than the transverse rod or shaft 180 connecting the opposite chains 101. Two opposite guides 130 (one shown in FIG. 3) force the upper chains 101 downwardly.

The chain belts are driven, through a speed variator and a reduction system, by a motor 14 of small horsepower. The same motor can be used to turn impregnation rollers (not shown) positioned in advance of the machine. At the exit of the machine are two take-off reels 150, 151 which remove, and wind up, cellophane protecting sheets 152, 153. Two circular saws 154, 155 trim the opposite edges of the laminate, which is then wound up at 156.

Figure 4:
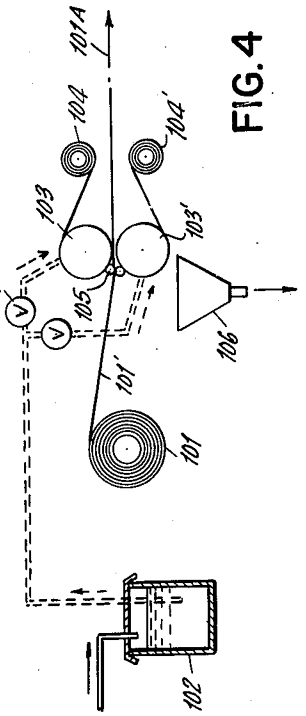
FIG. 4 illustrates a resin impregnation apparatus.

FIG. 4 illustrates a preferred apparatus for impregnating the laminate before it enters the polymerization vessel. The roll 101, of fiber glass mat for example, feeds the mat 101' to impregnation rollers 103, 103', between protective cellophane bands unreeling from rolls 104, 104'. The feeding of the resin, taken from tank 102 through valves 102', is so regulated that two resin beads are formed and maintained at 105. The beads are of uniform thickness (1 to 2 cms.). The impregnated mat and cellophane sheet assembly 101A then passes into the polymerization vessel, containing the corrugating chain belts.

The polymerization vessel is heated by steam coils (not shown) or other conditioning means required for the resin being employed.

The shape of the bends crosswise to the direction of motion of the rolled material can be chosen at will by replacing the cylindrical tubular elements by others having the desired shape. The following composition is a non-limiting example of polyester resins that can be satisfactorily used in the production of the reinforced shaped rolled plastic material according to the present invention.

| | Percent |
|---|---|
| Polyester (60% mono ethyleneglycol maleate–40% mono ethyleneglycol phthalate) | 75 |
| Styrene | 25 |
| Benzoyl peroxide | 1 |

The viscosity of the mixture should be neither too high (giving a resin difficult to handle) nor too low (a resin easily spreading out from the sides), but should be of the order of 4 to 6 poises.

It has been found advisable to disperse the benzoyl peroxide into an equal quantity of tricresyl phosphate, which results in a paste.

As a reinforcement, mats of different weights per sq. meter are used. Good results are obtained with mats weighing about 450 gr./sq. m., having fibers of a medium 5 cm. length, preferably sized with polystyrene emulsions.

The resin may be colored with mineral pigments rather than soluble ones that interfere in the polymerization of the resin and possess stability shortcomings.

The speed of the apparatus is so regulated as to allow of about a 20 minute polymerization interval, at a temperature of about 85–90° C. The preferred process described applies comparatively low pressures to the material. The temperatures selected avoid formation of blisters. All of the process and apparatus details described in the copending Ugo Monaco application are incorporated herein, by reference.

The accompanying drawing illustrates the application of a single spacing device acting on the shaping rollers of the upper chain of the corrugated machine. It is however understood that the present invention includes the use of a second spacing device acting on the rollers of the lower chain, and the application of additional devices of this character either on the rollers of the upper chain or on those of the lower chain. This is obvious to persons skilled in the art, and there appears to be no need to complicate the drawing in these respects.

It is noted that in the prior application there has been taken into consideration the possibility of substituting other shaping elements, having specially needed forms, for the cylindrical shaping elements. It is therefore evident that the positioning of holding wheels 5 of the present invention can be replaced by other holding elements which can be rigid, and can be shaped to conform or interfit, to accommodate any special form of the shaping rolls selected for the corrugating machine.

I claim:

1. A polymerization apparatus for continuous production of a corrugated sheet of resin-reinforced material, comprising a polymerization vessel, a pair of endless upper and lower moving belts at least in part disposed in the vessel and having adjacent portions travelling in the same straight-line direction, means for rotating the belts, means for mounting the material, impregnated with a resin-forming material, for travel between the said adjacent portions of the belts, the belts carrying rollers disposed transversely to the travelling direction of the material, spacing collars on opposite end portions of the rollers of the lower belt, the weight of the rollers of the upper belt resting upon said collars, the rollers of the respective belts interdigitating in said adjacent portions to produce and to maintain transverse corrugations in the material during the polymerization of the resin-forming material, means constraining the lower belt to substantially straight-line motion in the said adjacent portion thereof, an idler device disposed in the vessel, the idler device having flexibly interconnected elements which interdigitate between at least three of the rollers of one of the belts in the region of said adjacent straight-line portions, to assist in maintaining parallelism in the spacing of the rollers in said region, the said belts comprising upper and lower chain belts, means operatively connecting the upper rollers to the upper chain belt, the latter means permitting some but limited freedom of movement of the upper rollers with respect to the upper chain belt, and means fixedly connecting the lower rollers to the lower chain belt.

2. A polymerization apparatus for producing a corrugated sheet of resin-reinforced material, comprising a polymerization vessel, a pair of endless upper and lower moving belts at least in part disposed in the vessel and having adjacent portions therein travelling in the same straight-line direction, means for turning the belts, means for feeding the material, impregnated with a resin-forming material, for travel between the said adjacent portions of the belts, the belts carrying rollers disposed transversely to the travelling direction of the material, spacing collars on opposite end portions of the rollers of the lower belt, the weight of the rollers of the upper belt resting upon said collars, the rollers of the respective belts interdigitating in said adjacent portions to produce and to maintain transverse corrugations in the material during the polymerization of the resin-forming material, means constraining the lower belt to substantially straight-line motion in the said adjacent portion thereof, an idler device disposed in the vessel, the idler device having flexibly interconnected elements which interdigitate between some of the rollers of one of the belts in the region of said adjacent portions, to assist in maintaining uniformity in the spacing of the rollers in said region, the said belts comprising upper and lower chain belts, means operatively connecting the upper rollers to the upper chain belt, the latter means permitting some but limited freedom of movement of the upper rollers with respect to the upper chain belt, means fixedly connecting the lower rollers to the lower chain belt, said idler device comprising a third chain belt mounted within said upper belt, and having means rolling about a transverse axis and forming said elements which interdigitate and which are dragged along by the upper roller.

3. A polymerization apparatus for producing a corrugated sheet of resin-reinforced material, comprising a polymerization structure, a pair of endless moving belts at least in part disposed in the structure and having adjacent portions therein travelling in the same straight-line direction, means for turning the belts, means for feeding the material, impregnated with a resin-forming material, for travel between the said adjacent portions of the belts, the belts carrying rollers disposed transversely to the travelling direction of the material, the rollers of the respective belts interdigitating in said adjacent portions to produce transverse corrugations in the material concomitantly with the polymerization of the resin-forming material, spacing collars on opposite end portions of the rollers of the lower belt, the weight of the rollers of the upper belt resting upon said collars, an idler device disposed in the polymerization structure, the idler device having flexibly interconnected elements which interdigitate between some of the rollers of one of the belts in the region of said adjacent portions, to assist in maintaining uniformity in the spacing of the rollers in said region, the said belts comprising upper and lower chain belts, means operatively connecting the upper rollers to the upper chain belt, the latter means permitting some but limited freedom of movement of the upper rollers with respect to the upper chain belt, means fixedly connecting the lower rollers to the lower chain belt, said idler device comprising a third chain belt mounted within said upper belt, and having means rolling about a transverse axis and forming said elements which interdigitate and which are dragged along by the upper roller, the idler device including a mounting means carrying the third chain belt, the mounting means being provided with transverse support means pivoted toward one end, and a device for adjustably positioning the other end of the support means upwardly and downwardly.

4. A polymerization apparatus for continuous production of a corrugated sheet of polymerized resin-reinforced material, comprising a pair of endless moving belts having adjacent portions travelling in the same straight-line direction, means for turning the belts, means for mounting the material, coated with a resin-forming substance, for travel between the said adjacent portions of the belts, the belts carrying rollers disposed transversely to the travelling direction of the material, the rollers of the respective belts interdigitating in said adjacent portions to produce transverse corrugations in the material concomitantly with the polymerization of the resin-forming material, spacing collars on opposite end portions of the rollers of the lower belt, the weight of the rollers of the upper belt resting upon said collars, an idler device having elements which interdigitate between and are dragged along by rollers of one of the belts in the region of said adjacent portions, to assist in maintaining parallelism in the spacing of the rollers in said region, guide plate means longitudinally directed in the vessel, the idler device comprising an endless flexible chain and means for mounting the chain, the mounting means having two sprocket wheels on which the chain turns, the chain being comprised of links, transverse pins connecting adjacent links, rolling bearing devices mounted on the pins, the bearing devices moving against and along the guide plate means, the elements which interdigitate comprising wheels rotatably mounted by the pins.

5. The apparatus of claim 4, said belts also comprising endless chains, the links of the three chains being substantially the same.

6. A polymerization apparatus for continuous production of a corrugated sheet of polymerized resin-reinforced material, comprising a pair of endless moving belts having adjacent portions travelling in the same straight-line direction, means for turning the belts, means for mounting the material, coated with a resin-forming substance, for travel between the said adjacent portions of the belts, the belts carrying rollers disposed transversely to the travelling direction of the material, the rollers of the respective belts interdigitating in said adjacent portions to produce transverse corrugations in the material concomitantly with the polymerization of the resin-forming material, an idler device having elements which interdigitate between and are dragged along by rollers of one of the belts in the region of said adjacent portions, to assist in maintaining parallelism in the spacing of the rollers in said region, guide plate means longitudinally directed in the vessel, the idler device comprising an endless chain and means for mounting the chain, the mounting means having two sprocket wheels on which the chain turns, the chain being comprised of links, transverse pins connecting adjacent links, rolling bearing devices mounted on the pins, the bearing devices moving against and along the guide plate means, the elements which interdigitate comprising wheels rotatably mounted by the pins, an adjustable transverse support element for said mounting means, the support element being pivoted toward one end thereof, and a device for adjustably positioning the other end of the support element upwardly and downwardly.

7. A polymerization apparatus for continuous production of a corrugated sheet of polymerized resin-reinforced material, comprising a pair of upper and lower endless moving belts having adjacent parallelly extending portions travelling in the same straight-line direction, sprocket wheels for turning and for mounting the belts, means for mounting the material, coated with a resin-forming substance, for travel between the said adjacent portions of the belts, the belts carrying rollers disposed transversely to the travelling direction of the material, the rollers of the respective belts interdigitating in said adjacent parallelly extending portions to produce transverse corrugations in the material concomitantly with the polymerization of the resin-forming material, an idler device having flexibly interconnected elements which interdigitate between and are dragged along by rollers of the upper belt in the region of said adjacent portions, to assist in maintaining parallelism in the spacing of the rollers in said region, the idler device being located between the said wheels of the upper belt, means to sandwich the resin-coated material between non-porous, protective sheets, the latter means being disposed in advance of the belts, and means disposed after the belts to remove the protective sheets.

8. An apparatus for producing a corrugated sheet of material, comprising a pair of endless moving belts having adjacent portions travelling in the same direction, means for feeding the material for travel between the said adjacent portions of the belts, the belts carrying rollers disposed transversely to the travelling direction of the material, the rollers of the respective belts interdigitating in said adjacent portions to produce transverse corrugations in the material, an idler device having flexibly interconnected elements which interdigitate between at least some of the rollers of one of the belts in the region of said adjacent portions, being dragged along thereby, to assist in maintaining a predetermined, desired spacing of the rollers in said region, the said belts comprising upper and lower chain belts, means operatively connecting the upper rollers to the upper chain belt, said means permitting some but limited freedom of movement of the upper rollers with respect to the upper chain belt, means fixedly connecting the lower rollers to the lower chain belt, said idler device comprising a third chain belt mounted within said upper belt, and having means rolling about a transverse axis and forming said elements which interdigitate and which are dragged along by the upper rollers, the idler device including a mounting means carrying the third chain belt, and means for adjustably positioning the mounting means to adjust the said elements toward and away from said one of the belts at the region of said adjacent portions.

9. An apparatus for producing a corrugated sheet of material, comprising a pair of endless moving belts having adjacent portions travelling in the same direction, means for turning the belts, means for feeding the material for travel between the said adjacent portions of the belts, the belts carrying rollers disposed transversely to the travelling direction of the material, the rollers of the respective belts interdigitating in said adjacent portions to produce transverse corrugations in the material, spacing collars on opposite end portions of the rollers of the lower belt, the weight of the rollers of the upper belt resting upon said collars, an idler device having elements which interdigitate between and are dragged along by the rollers of one of the belts in the region of said adjacent portions, to assist in maintaining uniformity and parallelism in the spacing of the rollers in said region, the said belts comprising upper and lower chain belts, means operatively connecting the upper rollers to the upper chain belt, said means permitting some but limited freedom of movement of the upper rollers with respect to the upper chain belt, means fixedly connecting the lower rollers to the lower chain belt, said idler device comprising a third chain belt mounted within said upper belt, and having means rolling about a transverse axis forming said elements which interdigitate and which are dragged along by the upper rollers.

10. A polymerization apparatus for continuous production of a corrugated sheet of polymerized resin-reinforced material, comprising a pair of endless moving belts having adjacent portions travelling in the same direction, means for turning the belts, means for mounting the material, coated with a resin-forming substance, for travel between the said adjacent portions of the belts, the belts carrying rollers disposed transversely to the travelling direction of the material, the rollers of the respective belts interdigitating in said adjacent portions to produce transverse corrugations in the material concomitantly with the polymerization of the resin-forming material, an idler device having elements which interdigitate between and are dragged along by rollers of one of the belts in the region of said adjacent portions, to assist in maintaining parallelism in the spacing of the rollers in said region, the idler device comprising an endless belt having a transverse width which is not more than about a fourth of the transverse width of the first two belts, and is substantially centrally disposed, in the transverse direction, with respect to the interdigitating portions of the first two belts.

11. An apparatus for producing a corrugated sheet of material, comprising a pair of endless moving belts having adjacent portions travelling in the same direction, means for turning the belts, means for feeding the material for travel between the said adjacent portions of the belts, the belts carrying rollers disposed transversely to the travelling direction of the material, the rollers of the respective belts interdigitating in said adjacent portions to produce transverse corrugations in the material, an idler device having elements which interdigitate between the rollers of one of the belts in the region of said adjacent portions, to assist in maintaining parallelism in the spacing of the rollers in said region, the idler device comprising an endless belt having a transverse width which is not more than about a fourth of the transverse width of the first two belts, and is substantially centrally disposed, in the transverse direction, with respect to the interdigitating portions of the first two belts.

12. A polymerization apparatus for continuous production of a corrugated sheet of polymerized resin-reinforced material, comprising a pair of endless moving belts having adjacent parallelly extending portions travelling in the same straight-line direction, wheels for turning and for mounting the belts, means for mounting the material, coated with a resin-forming substance, for travel between the said adjacent portions of the belts, the belts being mounted one above the other and carrying rollers disposed transversely to the travelling direction of the material, spacing collars on opposite end portions of the rollers of the lower belt, the weight of the rollers of the upper belt resting upon said collars, the rollers of the respective belts interdigitating in said adjacent parallelly extending portions to produce transverse corrugations in the material concomitantly with the polymerization of the resin-forming material, means constraining the lower belt to substantially straight-line motion in the said adjacent portion thereof, an idler device having flexibly interconnected transversely directed elements which interdigitate between and are dragged by at least two rollers of the upper belt in the region of said adjacent parallelly extending straight-line portions, to assist in maintaining parallelism in the spacing of the rollers in said region, the idler device being located between the said wheels of the upper belt.

13. A polymerization apparatus for producing a corrugated sheet of resin-reinforced material, comprising a pair of juxtaposed endless moving belts having adjacent parallelly extending portions travelling in the same straight-line direction, sprocket wheels for moving and for mounting the belts, means for feeding the material, impregnated with a resin-forming material, for travel between the said adjacent portions of the belts, the belts being mounted one above the other and carrying rollers disposed transversely to the travelling direction of the material, the rollers of the respective belts interdigitating in said adjacent portions to produce and to maintain transverse corrugations in the material during the polymerization of the resin-forming material, means constraining the lower belt to substantially straight-line motion in the said adjacent portion thereof, an idler device having flexibly interconnected elements which interdigitate between at least three of the rollers of the upper belt in the region of said adjacent portions that move in a straight-line, to assist in maintaining uniformity and parallelism in the spacing of the rollers in said region, the idler device being located between the said wheels of the upper belt, said idler device having means rolling about a transverse axis and forming said elements which interdigitate, which means are dragged by and along the upper belt, and means for adjustably positioning the rolling means of the idler device toward and away from the upper belt at the region of said adjacent portions.

14. An apparatus for producing a corrugated sheet of material, comprising a pair of upper and lower endless moving belts having adjacent parallelly extending portions travelling in the same straight-line direction, sprocket wheels for turning and for mounting the belts, means for feeding the material for travel between the said adjacent portions of the belts, the belts carrying rollers disposed transversely to the travelling direction of the material, the rollers of the respective belts interdigitating in said adjacent portions to produce transverse corrugations in the material, spacing collars on opposite end portions of the rollers of the lower belt, the weight of the rollers of the upper belt resting upon said collars, an idler device having flexibly interconnected elements which interdigitate between the rollers of the upper belt in the region of said adjacent portions, to assist in maintaining parallelism in the spacing of the rollers in said region, the idler device being located between the sprocket wheels of the upper belt.

15. An apparatus for producing a corrugated sheet of material, comprising a pair of upper and lower endless moving belts having adjacent parallelly extending portions travelling in the same direction, sprocket wheels for turning and for mounting the belts, means for feeding the material for travel between the said adjacent portions of the belts, the belts carrying rollers disposed transversely to the travelling direction of the material, the rollers of the respective belts interdigitating in said adjacent portions to produce transverse corrugations in the material, spacing collars on opposite end portions of the rollers of the lower belt, the rollers of the upper belt having end collars, the upper belt having means provided for each of said end collars to articulate the rollers to the belt, there being sufficient free play between the said end collars and the said means so that the weight of the rollers of the upper belt rests upon the said spacing collars, an idler device having flexibly interconnected elements which interdigitate between the rollers of the upper belt in the region of said adjacent portions, to assist in maintaining parallelism in the spacing of the rollers in said region, the idler device being located between the sprocket wheels of the upper belt.

16. A polymerization apparatus for producing a corrugated sheet of resin-reinforced material, comprising a pair of juxtaposed endless moving belts having adjacent parallelly extending portions travelling in the same direction, sprocket wheels for moving and for mounting the belts, means for feeding the material, impregnated with a resin-forming material, for travel between the said adjacent portions of the belts, the belts being mounted one above the other and carrying rollers disposed transversely to the travelling direction of the material, the rollers of the respective belts interdigitating in said adjacent portions to produce and to maintain transverse corrugations in the material during the polymerization of the resin-forming material, an idler device having flexibly interconnected elements which interdigitate between at least three of the rollers of the upper belt in the region of said adjacent portions, to assist in maintaining uniformity and parallelism in the spacing of the rollers in said region, the idler device being located between the said wheels of the upper belt, said idler device having means rolling about a transverse axis and forming said elements thereof which interdigitate, which means are dragged by and along the upper belt, and means for adjustably positioning the rolling means of the idler device toward and away from the upper belt at the region of said adjacent portions.

References Cited in the file of this patent

UNITED STATES PATENTS

| | | |
|---|---|---|
| 827,419 | Causer | July 31, 1906 |
| 1,276,187 | Vos et al. | Aug. 20, 1918 |
| 1,769,950 | Hensley | July 8, 1930 |
| 2,534,523 | McCormick | Dec. 19, 1950 |
| 2,663,351 | Osborne et al. | Dec. 22, 1953 |
| 2,723,708 | Tefft | Nov. 15, 1955 |
| 2,784,763 | Shorts | Mar. 12, 1957 |
| 2,939,501 | Hoffman | June 7, 1960 |

FOREIGN PATENTS

| | | |
|---|---|---|
| 748,368 | Great Britain | May 2, 1956 |